Patented May 6, 1952

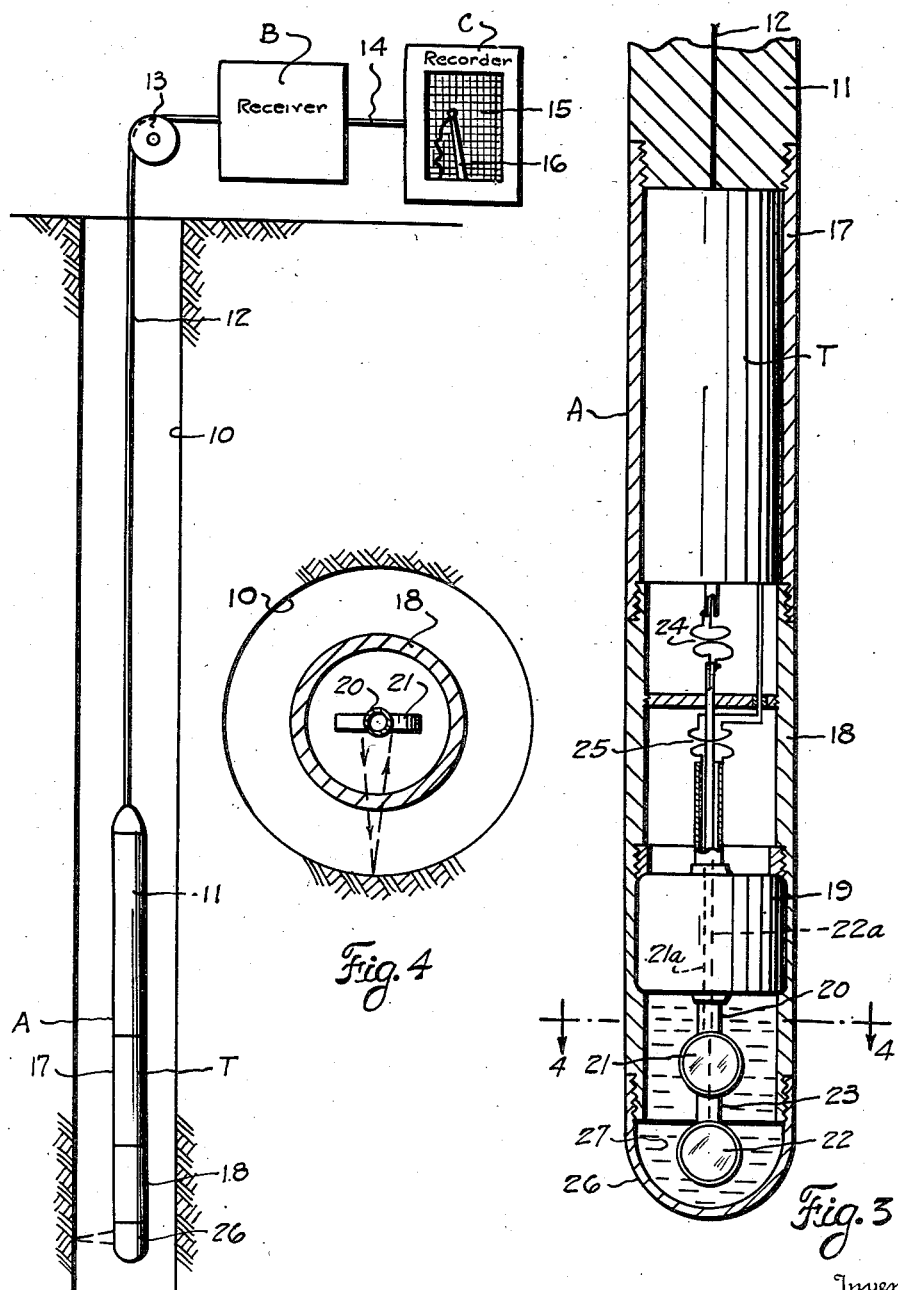

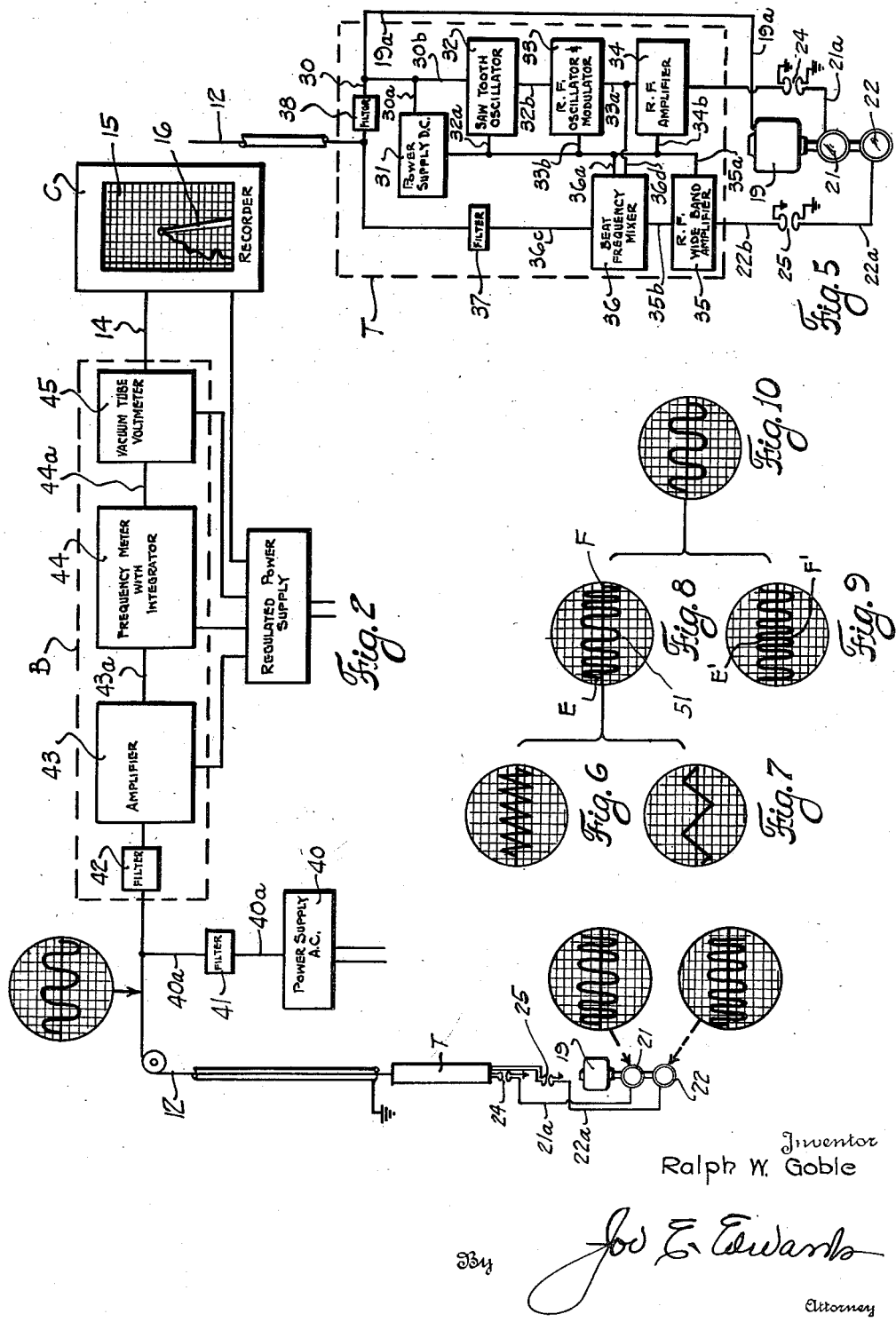

2,595,241

UNITED STATES PATENT OFFICE 2,595,241

METHOD AND APPARATUS FOR MEASURING THE CROSS SECTIONAL AREA OF WELL BORES BY SUPERSONIC WAVES

Ralph W. Goble, Long Beach, Calif., assignor to Eastman Oil Well Survey Company, Denver, Colo., a corporation of Delaware Application August 1, 1947, Serial No. 765,450

12 Claims. (Cl. 177—352)

1

This invention relates to new and useful improvements in methods of and apparatus for measuring distance or time interval by the use of sound waves in the so-called supersonic range.

The invention relates particularly to methods and apparatus primarily adapted for use in measuring the diameter or cross-sectional area of a well bore but which may be employed for other purposes, such as determining the thickness of pipe, cement or other articles present in said bore or for locating the position of pipe or materials within the bore.

One object of the invention is to provide an improved method and means for measuring distances and time intervals, whereby a well bore diameter may be determined or the position and area of material within said well bore may be ascertained; the results being accomplished without the use of mechanical measuring elements or arms whereby the measuring capacity of the apparatus is substantially unlimited and the inherent disadvantages of the usual mechanical elements are obviated.

An important object of the invention is to provide an improved measuring method which is particularly useful in measuring well bore diameters and which involves the continuous transmission and reception of sound waves of high frequency in the so-called supersonic range, together with an improved method of measuring the time difference or interval between the transmission of said waves and the reception of the associated or echo waves; such time difference or interval being representative or indicative of the distance between the point of transmission and the point of reflection of said waves, whereby said distance may be accurately measured and determined.

An important object of the invention is to provide an improved method, of the character described, wherein the frequency of a modulated frequency wave which actuates a sound transmitter to generate and propagate high frequency sound waves is beat with a frequency generated by the received sound waves after they have been transmitted to and reflected back from a reflecting surface, whereby the beat frequency so produced is a measure of the distance between the point of transmission and the reflecting surface; said beat frequency being utilized to actuate a recorder mechanism to provide a visible indication of the distance between said point of transmission and the reflecting surface.

Still another object of the invention is to provide an improved apparatus, of the character described, wherein a modulated frequency wave is generated and conducted to a sound transmitter to actuate the same and at the same time is conducted to a beat frequency mixer; the actuation of the transmitter generating and transmitting sound waves of high frequency in the so-called supersonic range, whereby said waves travel outwardly until striking a reflecting surface from which said waves are reflected back to a receiver which functions to generate a voltage, the frequency of which is conducted to the beat frequency mixer and is mixed therein with the frequency of the modulated frequency wave to produce a third or beat frequency, which is a measure of the distance travelled by the transmitted sound wave as it is sent from the transmitter and reflected back to the receiver, whereby said beat frequency is representative or indicative of the distance between the point of transmission and the surface from which the sound wave is reflected.

A further object of the invention is to provide an improved supersonic method and apparatus for measuring well bore diameters wherein frequency modulated waves are employed to excite a transmitting or sending crystal to generate and propogate high frequency sound waves which are received after being reflected from the wall of the well bore and utilized to generate a voltage, the frequency of which is beat with the frequency of the original modulated wave to produce a beat frequency which is representative of the distance between the point of transmission and the wall of the bore; the use of the modulated frequency waves making it possible to operate the apparatus continuously without interruption, as compared to the intermittent type pulse-transmitters which have been previously used.

A specific object of the invention is to provide an improved measuring method of the character described, which consists in continuously transmitting high frequency vibrations outwardly within a well bore and determining by an improved beat frequency method the time interval required for the vibrations, which are reflected from the wall of said well bore, to arrive at the point of transmission, whereby an accurate determination of well bore diameter may be made; the method being primarily useful in accurately measuring relatively small distances such as are encountered in well bores.

Still another object of this invention is to provide an apparatus, of the character described, having means for utilizing the beat frequency which is representative of the distance being measured to actuate a continuously operated recorder, whereby a continuous visible record of the measurements being made is produced.

A particular object of the invention is to provide an improved method and means for measuring well bore diameters, wherein the beat frequency which is indicative of the well bore diameter is, by means of a frequency meter and integrator circuit, converted into amplitude which varies in direct ratio or proportion to the variations in said frequency, said amplitude actuating a suitable recording mechanism to visibly record the well bore diameter being measured.

The construction designed to carry out the invention will be hereinafter described together with other features of the invention.

The invention will be more readily understood from a reading of the following specification and by reference to the accompanying drawing, wherein an example of the invention is shown, and wherein:

Figure 1 is a schematic view of a well bore illustrating the improved apparatus for practicing the method, with the measuring assembly lowered within said bore and the receiving and indicating unit located at the surface, Figure 2 is a block diagram of an apparatus constructed in accordance with the invention, Figure 3 is an enlarged, transverse, vertical, sectional view of the transmitting and receiving assembly, Figure 4 is a horizontal, cross-sectional view taken on the line 4—4 of Figure 3, Figure 5 is a wiring diagram of the transmitting and receiving assembly which is arranged to be lowered within the well bore, Figure 6 is a face view of an oscilloscope screen illustrating the shape of the original generated frequency wave, Figure 7 is a similar view illustrating the sawtooth wave which modulates the frequency of the original wave, Figure 8 is a similar view showing the shape of the modulated frequency wave which is conducted to the sound transmitter for actuating the same, Figure 9 is a similar view illustrating the frequency wave which is generated by the reflected or received sound waves, and Figure 10 is a similar view illustrating the shape of the beat frequency wave which is produced by beating the frequency of the transmitted wave with the frequency of the wave generated by the received sound wave.

In the drawings, the numeral 10 designates a well bore which extends downwardly through the sub-surface strata from the ground surface. A measuring assembly A which includes a transmitting and receiving unit T, and which will hereinafter be described in detail, is arranged to be lowered within the well bore and said assembly is connected to the lower end of a sinker or lowering bar 11. The sinker bar is attached to the lower end of a conductor cable 12 and said cable functions to suspend or support the measuring assembly and at the same time provides an electrical connection between said assembly and the surface equipment. The cable is of the usual sheathed type with the outer sheath or covering thereof forming the ground conductor of the electrical circuit. The cable extends upwardly to the surface and passes over a suitable pulley 13 in the derrick (not shown) and has electrical connection with a receiving apparatus B which is, in turn, electrically connected through a wire 14 with a recorder C. The recorder C is of standard construction and may be purchased on the open market and includes a movable tape or chart 15 and a marking stylus 16. The stylus 16 is electrically controlled in its movement in accordance with the operation of the measuring assembly A and receiver B, as will be explained and functions to form a permanent record of the particular measurement which is being made.

The measuring assembly A which is arranged to be lowered within the well bore 10 includes a tubular casing or housing 17 which has its upper end secured to the sinker bar 11. The electrical transmitting and receiving unit T, the electrical circuits of which will hereinafter be described in detail, is mounted in the tubular casing 17 and has its lower end supported upon the upper end of a tubular sleeve section 18 which is threaded into the lower end of the casing or housing and which forms a continuation thereof. An electrical motor 19 which is arranged to operate at a predetermined desired speed is mounted within the sleeve and has a downwardly extending hollow or tubular shaft 20. A sending crystal or sound transmitter 21 is secured to the lower end of said shaft and below said transmitter is a receiving crystal 22 which is connected thereto by a short stub shaft 23, whereby when the motor 19 is operated to rotate its shaft 20, the sending crystal or transmitter, as well as the receiving crystal 22 is simultaneously rotated. As has been noted, the motor is operated at a predetermined speed, whereby the crystals 21 and 22 are rotated at a known R. P. M.

The sending crystal or sound transmitter 21 is connected to a wire 21a which extends upwardly through the hollow or tubular shaft of the motor 19 and has its upper end connected to the lower portion of an inductive coupling loop arrangement 24. The upper portion of the coupling 24 is connected with the transmitter circuit of the transmitting and receiving unit T. The receiving crystal 22 is electrically connected through a wire 22a, which extends upwardly through the tubular shaft 20 of the motor, to the lower portion of a second inductive loop arrangement 25. The upper portion of the coupling 25 has connection through wires 22b with the receiving circuit of the transmitter and receiving unit T. By the use of the inductive couplings, it will be obvious that the transmitter and receiver unit T may remain stationary within the housing or casing 17, while the sending and receiving crystals 21 and 22 which are electrically connected or coupled thereto may rotate when the motor 19 is actuated without breaking the electrical connection. The sending and receiving crystals 21 and 22 are preferably enclosed by a hollow cap member or closure 26 which threads onto the lower end of the sleeve 18 and it is desirable that the sending and receiving crystals be immersed within a suitable liquid 27, such as light oil, said liquid being contained within the lower end of the sleeve and within the hollow cap member 26. It is pointed out however, that the enclosure of the sending and receiving crystals is not necessary and the device would operate with said crystals extending outwardly from the casing or sleeve 18 so that the normal standing fluid within a well bore would surround said crystals and would function to transmit and reflect sound waves therethrough. The primary function of the hollow cap member or closure is to protect the crystals against damage when lowered within the well bore.

It is also pointed out that the invention is not to be limited to the particular inductive coupling loop arrangements for electrically connecting the stationary transmitting and receiving unit T with the rotating crystals 21 and 22 since obviously it would be possible to employ slip rings or other similar connections to electrically connect these parts.

The transmitting and receiving unit T is subject to some variation in construction and a preferred form of the circuits employed therein is illustrated in Figure 5. In the preferred embodiment, the conductor cable 12 is connected to a lead-in wire 30 which has connection through a wire 30a with a D. C. power supply 31. A conductor 30b electrically connects the lead-in wire 30 with a saw-tooth oscillator 32, which oscillator is supplied with power through a wire 32a which extends from the power supply 31. A conductor 32b electrically connects the sawtooth oscillator to a radio frequency oscillator and modulator 33 which is, in turn, connected through a wire 33a with a radio frequency amplifier 34. Both the oscillator and modulator unit 33 and the amplified 34 are powered by the D. C. power supply unit 31 through conductors 33b and 34b. The amplifier 34 has electrical connection through the inductive coupling 24 and wire or conductor 21a with the sending crystal or sound transmitter 21. It has been found desirable to operate the saw tooth oscillator 32 which varies the frequency of the R. F. oscillator 33 at approximately 1000 cycles per second although it could be operated either above or below said frequency; the limit on the upper frequency of this oscillator is controlled or determined by the distance between the point of transmission and the reflecting surface since obviously the frequency should not be so high as to locate the transmitter unit more than one wave length of time away from the wall of the bore. Actually, the R. F. frequency and the supersonic frequency which have the same numerical value may be varied from approximately 500 kc. to 20 mc. for center frequency, depending upon the type of fluid or material in which the apparatus is operating; in oil and water the higher frequencies are satisfactory, whereas in fluids such as drilling muds the lower frequencies in the range are more desirable.

The receiving crystal 22, as has been explained, is electrically connected to the wire 22a which extends upwardly and which has electrical connection with the conductor 22b through the inductive coupling 25. The conductor 22b is electrically connected with the receiving circuit of the unit T which circuit includes a wide band radio frequency amplifier 35 having power supplied thereto from the D. C. power unit 31 through a wire 35a. The wide band amplifier 35 has electrical connection through a conductor 35b with a beat frequency mixer 36 which is also powered through the electrical wire 36a by the power unit 31. The outlet side of the beat frequency mixer 36 has electrical connection through a conductor 36c with the conductor cable 12.

A wire 36d which has one end connected to the conductor 33a which leads from the radio frequency oscillator and modulator 33, has its opposite end connected to the beat frequency mixer 36, whereby the output of said radio frequency oscillator and modulator is conducted to said mixer. As will be explained, alternating current is supplied to the unit T from the surface and a suitable filter 37 is connected in the line 36c to prevent said alternating current which flows down the cable 12 from entering the receiver circuit. A second filter 38 of any suitable type is connected in the lead-in wire 30 and prevents the passage of current from the mixer 36 which flows upwardly through the conductor 36c and conductor cable 12 to the transmitter circuit.

It is pointed out that the saw-tooth oscillator 32, radio frequency oscillator and modulator 33 and radio frequency amplifier 34 comprise a transmitter circuit while the radio frequency wide band amplifier 35 and beat frequency mixer 36 form the receiving circuit, both circuits located in the single physical transmitting and receiving unit T.

As will be explained, alternating current is conducted downwardly through the conductor cable 12 and is utilized to actuate the D. C. power supply unit 31, whereby power is supplied to the various units of the transmitter and receiver circuits. At the same time, the alternating current functions to synchronize the operation of the saw-tooth oscillator which generates a saw-tooth wave of the pattern illustrated in the oscilloscope screen of Figure 7. Through the electrical connecting wire 32b, the radio frequency oscillator and modulator 33 which generates a radio frequency wave of the pattern shown in Figure 6, is controlled by the saw-tooth wave form of the saw-tooth oscillator 32 and therefore within the unit 33, a predetermined radio frequency wave is frequency modulated with the result that the wave pattern or form of the pattern illustrated in the oscilloscope screen indication of Figure 8 is produced. This frequency modulated wave is then amplified through the radio frequency amplifier 34 and is conducted to the sending crystal 21 to excite the same. Excitation of the sending crystal 21 results in said crystal generating and propagating high frequency sound waves outwardly therefrom and due to the particular construction of the crystal these waves are directed in a more or less narrow beam. It is well known that it is possible to construct a quartz crystal to be highly directional and this is accomplished by constructing the face diameter of the crystal at least ten wave lengths of the operating frequency; both the crystals 21 and 22 are of this type. The sound waves so generated travel radially outwardly from the sending crystal 21 until they strike a reflecting surface, such as the wall of the well bore, and said waves are thereupon reflected or echoed back and are received by the receiving crystal 22 which is disposed in alignment but below the sending crystal. The received or echo waves striking the receiving crystal excite said crystal and function to generate a radio frequency voltage or wave which is transmitted through the wire 22a, coupling 25 and wire 22b to the wide band amplifier 35. The frequency of the wave generated by the receiving crystal is the same as the frequency of the radio frequency wave which initially excites the sending crystal. Within the amplifier the radio frequency voltage or wave generated by the receiving crystal because of the received or echo sound wave is conducted into the beat frequency mixer 36.

The frequency modulated wave which originates in the oscillator and modulator unit 33 and which initially excites the sending crystal 21 to generate the high frequency sound waves is also conducted to the beat frequency mixer through the wire 36d and thus at any given instant, the transmitted radio frequency wave is beat with the received radio frequency wave which has been generated as a result of the received or echo sound wave and this produces a third or beat frequency which is conducted upwardly through the wire 36c and the conductor cable 12 to the surface. As noted, the frequency of the originating waves from the oscillator and modulator 33 is the same as the frequency of the waves produced by the receiving crystal and therefore, the frequencies conducted to the mixer from unit 33 and receiving crystal 22 are different only in point of time, that is, the time lapse or interval which is required for the sound waves to travel from the sending crystal 21, to the reflecting surface and then back to the receiving crystal will control the point in the frequency cycle of the originating wave at which the wave, generated by the receiving crystal 22, will enter the mixer 36. As the wave produced because of the receiving crystal 22 being actuated by the received or echo waves is instigated and conducted to the mixer, the frequency of this wave at its inception is beat with the frequency of the originating wave at that particular instant in the frequency cycle of the originating wave to produce the beat frequency. It will be evident that the beat frequency which is produced in the mixer 36 will be dependent upon and in accordance with the time required for the high frequency sound waves to travel from the sending crystal 21 to the reflecting surface and back to the receiving crystal; this time will, of course, be directly proportional to the distance between the crystals and the reflecting surface and thus, the beat frequency produced will be indicative or representative of such distance. As the distance between the crystals and the reflecting surface varies, the beat frequency produced in the mixer 36 will be varied because the waves generated by the receiving crystal will be received at various points in the frequency cycle of the originating wave and by utilizing the particular beat frequency to actuate the recording mechanism at the surface, it is possible to obtain a visible indication of the distance between said crystals and the reflecting surface.

In order to utilize the beat frequency which is obtained in the mixer 36 to actuate the recorder C, the electrical apparatus illustrated in block diagram in Figure 2 is employed. The conductor cable 12 which has connection with the transmitting and receiving unit T extends upwardly to the surface and the beat frequency produced in the mixer, which is representative of the distance being measured, is transmitted upwardly therethrough. An alternating current power supply 40 which supplies the necessary current for operation of the transmitting and receiving unit is located at the surface and is connected through a wire 40a with the conductor cable 12. The particular frequency of the power supply may vary over a wide range of from 60 cycles per second to 3000 cycles per second, but in actual practice, a frequency of 400 cycles per second was chosen since 400 cycle generators are readily available commercially. A suitable blocking filter 41 is disposed in the line 40a and functions to prevent the passage of the current which flows upwardly through the cable 12 back into said power supply. A similar filter 42 is connected in the cable 12 beyond the point of connection of the wire 40a and this filter functions to prevent the passage of the alternating current from the unit 40 into the electrical circuits of the receiver B.

The beat frequency waves which are produced within the beat frequency mixer 36 and, which as has been explained, are representative of the distance between the point of transmission of the sound waves and the surface from which said sound waves are reflected is conducted through the cable 12 to an amplifier 43. After passing through the amplifier, the beat frequency waves flow through a wire 43a to a frequency meter 44 which has an integrator circuit incorporated therein. The frequency meter functions to measure the frequency and integrate the beat frequencies of all those waves which are received during one revolution of the rotating crystals and thus the output from the meter is an amplitude which is the average of the beat frequencies produced during one revolution of said crystal. Through a connecting wire 44a, the amplitude flowing from the frequency meter is utilized to actuate a vacuum tube voltmeter 45, which as is well known, is actuated by a voltage differential across its tube circuit. The vacuum tube voltmeter 45 has connection through the wire 14 with the recorder C and is adapted to impart a movement to the stylus 16 thereof.

The surface equipment is utilized to transpose the beat frequency waves, which are produced by means of the received sound waves acting upon the receiving crystal, into amplitude and to utilize this amplitude to impart movement to the recording stylus. The chart 15 of the recorder C is movable at a predetermined rate and the length of said chart is indicative or representative of depth. The movement of the chart longitudinally through the recorder and beneath the stylus is synchronized to the lowering rate of the conductor cable and the measuring assembly A, whereby the position or depth at which any measurement is made within the well bore is indicated by said chart. The movement of the stylus transversely of said chart is in direct ratio or proportion to the particular beat frequency waves which are produced in the mixer 36 and is therefore indicative or representative of the distance between the sending and receiving crystals and the particular reflecting surface. It is evident that the chart and stylus will provide a visible continuous record of the measurements being made as the apparatus is lowered within the well bore.

The invention will be described as measuring the cross-sectional area or diameter of a well bore but it is noted that it may be employed for other purposes and can be utilized wherever it is desired to accurately measure relatively small distances.

In the operation of the apparatus in making well bore measurements, the assembly A is lowered downwardly through the well bore continuously at a predetermined rate and the chart 15 of the recorder C is moved longitudinally at the same rate so that said chart will accurately record the depth or elevation of said assembly. As the device is lowered, the A. C. power supply 40 at the surface provides alternating current to the transmitting and receiving unit T within the assembly A, such alternating current flowing downwardly through the conductor 12 and thence through the line 30 and wire 30a to the D. C. power supply 31 which powers the various units of the transmitting and receiving circuits. The alternating current is also conducted to the sawtooth oscillator 32 through the line 30b and functions to synchronize the operation of the said oscillator.

A conductor 19a extends from the line 30 and carries the alternating current to the electric motor 19 which is located within the sleeve 18 of the assembly A, whereby said motor is actuated to rotate the sending and receiving crystals 21 and 22. The motor 19 is of a constant predetermined speed so that the crystals 21 and 22 are rotated at a predetermined R. P. M. The particular R. P. M. of the motor 19 is subject to wide variation but 10 R. P. M. has been found satisfactory, although said motor could operate from 1 R. P. M. to a speed in excess of 100 R. P. M. It is evident that at 10 R. P. M. with the sending crystal operating at a frequency of 1000 cycles per second, it is possible to obtain 6000 points of information during one revolution of the shaft.

As the current energizes the D. C. power supply 31, the transmitting unit is set into operation and oscillator 32 generates the saw-tooth wave which has the form or pattern illustrated in Figure 7. The radio frequency oscillator and modulator 33 generates the frequency wave, shown in the pattern of Figure 6, and since the saw-tooth oscillator 32 controls the operation of the unit 33, the predetermined radio frequency wave of the latter is frequency modulated with the result that the wave pattern or form illustrated in the oscilloscope screen of Figure 8 is produced.

The frequency modulated waves from the oscillator and modulator 33 are then amplified through the radio frequency amplifier 34 and conducted to the sending crystal or sound transmitter 21 to excite the same. Excitation of the sending crystal results in said crystal generating and propagating high frequency sound waves in the so-called supersonic range and these waves travel outwardly from the sending crystal; because of the construction of the crystal, together with the high frequency of the sound waves, said waves are directed outwardly in a narrow beam. It is noted that the use of sound waves of a frequency in the so-called supersonic range makes possible the accurate measurement of extremely small distances such as are encountered in well bores. As used herein, the terms "radio frequency" and "supersonic frequency" identify frequencies having the same numerical values, with "radio frequency" being used to refer to electrical energy and "supersonic frequency" being employed when it is converted to mechanical energy.

The receiving crystal 22 is rotating simultaneously and at the same rate with the sending crystal and, therefore, the high frequency sound waves which are directed outwardly from the sending crystal 21 travel outwardly and upon striking the wall of the well bore are reflected or echoed back toward the receiving crystal 22. Upon striking the receiving crystal, the echo wave or waves excite said crystal and function to generate a radio frequency voltage which is transmitted through the wire 22a, coupling 25 and wire 22b to the radio frequency wide band amplifier 35. After amplification the radio frequency voltage so generated is conducted into the beat frequency mixer 36.

It is noted that the frequency of the transmitted sound waves is so much greater than the speed of rotation of the rotating crystals 21 and 22 that each sound wave is sent, reflected and received before the crystals have rotated any appreciable distance. Because of the high frequency and design of the crystals, the sound waves are directed from the sending crystal in a narrow beam and thus, it might be said that each reflected sound waves returns to the receiving crystal 22 in substantially the same radial path which it travelled as it was projected from the sending crystal. Therefore, even though the crystals are rotating, an accurate measurement is accomplished at any given instant and the rotation of said crystals has no effect on the accuracy of the device. It is, of course, obvious that as the crystals rotate, the sending crystal 21 operating continuously causes the continuously transmitted sound waves to scan the wall of the well bore.

The frequency of the frequency modulated waves which originate in the oscillator and modulator unit 33 and which are illustrated in the wave form or pattern of Figure 8, is conducted to the beat frequency mixer at the instant of its transmission to the sending crystal 21. Thus, when the receiving crystal receives the echo sound waves to generate a radio frequency voltage which is conducted to the mixer, the frequency of this wave is beat with the frequency of the original wave. By beating the frequency of the original wave with the frequency of the wave generated by the reflected or echo wave, a third or beat frequency is produced which is conducted upwardly through the cable 12 to the surface equipment. It will be apparent that the particular beat frequency which is produced is entirely dependent upon the time interval which elapses from the instant of transmission of the sound waves by the sending crystal 21 and the intant of reception of the reflected sound waves by the receiving crystal 22. This time interval is a direct measure of the distance between the point of transmission and the reflecting surface and, therefore, the beat frequency is a measure of the distance between the sending crystal and the wall of the well bore.

In order to more clearly explain the mixing of the frequency of the original transmitting wave which operates the sending crystal 21 and the frequency of the resultant wave which is produced by the reception of the echo sound wave by the receiving crystal 22, reference is made to Figures 8 to 10. Figure 8 illustrates one frequency cycle of the original frequency modulated wave generated by the oscillator and modulator unit 33; the point E represents the start of the cycle and will be presumed to be the instant that the sending crystal 21 is actuated to send out the high frequency sound wave. The point F on the wave pattern of Figure 8 is representative of the end of the frequency cycle. In Figure 9, one frequency cycle of the wave generated by the actuation of the receiving crystal because of the received sound waves is illustrated, the beginning of said cycle being at E' which is the instant of reception of the sound wave which was originally transmitted at the start E of the frequency cycle of the original wave. It is apparent that the start E' of the wave generated by the receiving crystal 22 which is representative of the instant of reception of the sound is behind the start E of the original wave in the frequency cycle which start represents the instant of transmission. This is caused by the fact that a predetermined time interval is required for the reflected wave to return to the receiving crystal and generate the voltage to start the frequency cycle of said voltage. Since the transmitter is continuously operated the frequency of the original wave has moved along in its cycle in point of time and the point 51 in the wave form of Figure 8 will be the frequency of the original wave present in the mixer at the instant that the frequency cycle of the wave, generated by the reflected sound waves striking the receiving crystal, is begun. Therefore, the frequency of the original wave at the point 51 in its cycle will be mixed or beat with the frequency at the starting point E' of the wave generated by the receiving crystal and the beating of these frequencies will produce the third or beat frequency which is subsequently conducted upwardly through the cable 12 and is utilized to actuate the surface recording apparatus. It is evident that as the distance between the sending crystal and the wall of the well bore varies, more or less time will be required for the reflected or echo waves to strike the receiving crystal 22 and thereby produce the second frequency in the mixer and thus the wave patterns shown in Figures 8 and 9 will overlap each other more or less in the cycle and in accordance with the particular distance being measured. Therefore, each time the distance between the sending crystal and the well bore wall varies, different beat frequencies will be produced and the specific beat frequency is representative of such distance.

As has been stated the sending and receiving crystals rotate at a constant speed and the sound waves are continuously sent out and received by said crystals. It will probably occur that the assembly A which has the rotating crystals at its lower end will be suspended off-center or toward one side of the well bore so that said crystals are not exactly centered within the bore. This means that the beat frequencies produced during one revolution of the crystals will not be constant and in order to operate the recorder to indicate the average cross-sectional area or diameter of the well bore, it is necessary that the beat frequencies obtained during each revolution be averaged and such average be utilized to operate the recorder. The averaging of the beat frequencies produced during each revolution of the crystals is accomplished by the surface equipment. As has been noted, the beat frequencies are conducted to the surface through the cable 12 and are then taken through the amplifier 43 and thence to the frequency meter 44 which has an integrator circuit incorporated therein. The integrator circuit includes a condenser and resistance arrangement wherein the resistance controls the discharge rate of the condenser. With this arrangement the beat frequencies which are produced during one revolution of the crystal are utilized to charge the condenser and through the control of the discharge rate of said condenser by the resistance, with such control being set in accordance with the speed of rotation of the crystals, all of the beat frequencies received during one revolution of said crystals are averaged so that the amplitude or voltage which is conducted to the vacuum tube voltmeter 45 through the line 44a is an average or mean amplitude of all of the amplitudes produced by all of the different beat frequencies which are the result of the sound waves transmitted and received during one revolution of said crystal. It is manifest that the average amplitude or voltage which is dependent upon the particular beat frequencies produced during one revolution of the crystals is conducted to the vacuum tube voltmeter 45.

The amplitude or voltage flowing to the voltmeter 45 is in direct ratio or proportion to the distances between the transmitting and receiving crystals 21 and 22 and the wall of the well bore during one complete revolution of the crystal and said amplitude is therefore representative of an average of the distance between said crystals and the well bore wall during one revolution. This average voltage or amplitude is utilized to operate the vacuum tube voltmeter, which as has been explained, is directly connected through the wire 14 with the recorder C. As is well known, the voltmeter operates on a differential of voltage applied thereto and as the average amplitude or voltage applied to the voltmeter upon each revolution of the crystals varies due to the variation in the diameter of the well bore under measurement, the movement of the stylus is variable in direct proportion thereto. As noted, the chart 15 is properly calibrated in distance and is movable longitudinally by a suitable timer (not shown) and thus the movement of the stylus 16 across said chart is an indication of the measurement of the average well bore diameter or cross-sectional area. It is evident that the chart provides a continuous record of the distance between the crystals 21 and 22 and the wall of the well bore throughout each revolution of said crystals, so that a continuous record of the average well bore diameters or cross-sectional area is produced as the apparatus is lowered through said well bore.

The particular feature of the present invention resides in the assembly A which is constructed so that the high frequency sound waves in the so-called supersonic range may be continuously transmitted and received as the crystals rotate to scan the wall surface of the well bore. The frequency of the electrical waves produced in the transmitting circuit is conducted to the beat frequency mixer at the instant of transmission and since the transmitter operates continuously, the frequency of the resultant wave occurring at the instant of reception of the sound wave is beat with the frequency of the transmitted wave. The particular beat frequency which is produced is dependent entirely upon the time lapse or interval between the instant of transmission and the instant of reception and, therefore, the beat frequency is representative not only of this time interval but also of the distance between the transmitting and receiving crystals and the reflecting surface which is the wall of the well bore. It will be evident that as the time interval and distance varies, the particular beat frequency produced varies in direct accordance therewith. The beat frequencies which are produced during one complete rotation of the crystals are then conducted to the frequency meter and integrator 44 wherein said frequencies are averaged to provide an average or mean amplitude which flows to the vacuum tube voltmeter. The average amplitude is, of course, representative of the average diameter or cross-sectional area of the well bore and it is this amplitude which controls movement of the stylus 16 of the recorder. The particular arrangement permits a continuous operation of the unit as it is lowered through a well bore and thus a continuous record of the average well bore diameter or cross-sectional area is produced.

Although the device has been disclosed as employed for measuring well bore diameters, it is obvious that it may be used for other purposes, such as locating pipe or other material within the well or for measuring the thickness of a cement wall behind the well casing. In the latter instance, a reflection of sound waves would be obtained from the inner wall of the cement and a second reflection of the sound waves obtained from the outer wall so that the time interval between reception of the two reflected waves would give information as to the thickness of said cement.

The device is relatively simple in operation and utilizes the sending and receiving crystals 21 and 22 which are rotated at a predetermined known speed. The alternating current which controls the operation of the motor 19 also synchronizes the operation of the saw-tooth oscillator 32 and this synchronization prevents temperature differences which may be present in the well bore and which would affect the cable 12 from interfering with the accurate operation of the apparatus. It is noted that the use of the high frequency sound waves in the so-called supersonic range provides a means whereby extremely small distances may be accurately measured. Although the apparatus has been described as conducting alternating current downwardly along the cable 12, it would be possible to provide a D. C. power supply unit at the surface in place of the A. C. power supply 40, in which instance the D. C. power supply unit 31 within the assembly A could be eliminated. It is also recognized that other types of transmitting and receiving circuits may be substituted for those shown and described in Figure 5 and so long as a frequency, which is representative of the instant of transmission of the sound wave is beat with a frequency which is representative of the instant of reception of the reflected sound wave, the purposes of the invention may be accomplished.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. The method of measuring the cross-sectional area of a well bore which consists in, continuously propagating a series of high frequency sound waves outwardly in radial directions and in a circular path within the well bore to scan the wall of the well bore, whereby each wave travels outwardly and is reflected back from the wall of the bore to the point of transmission in one radial plane therein, receiving each reflected wave and determining the time interval between the instant of transmission and the instant of reception of said wave, integrating the time intervals of all waves sent and received during one complete scanning of the wall surface, and transposing said integrated time intervals into an indication which is representative of the cross-sectional area of the well bore.

2. The method of determining the cross-sectional area of a well bore which consists in, continuously generating within the well bore a series of original frequency modulated electrical waves, utilizing said waves to generate a continuous series of high frequency, frequency-modulated sound waves which are propagated outwardly from a point within the well bore in radial planes toward the wall thereof, the point of propagation of the waves being continuously varied about an annular path within the well bore whereby the propagated waves scan the wall of the well bore, receiving adjacent the point of transmission of each sound wave the reflected or echo sound wave after it has been reflected from the wall of the bore, utilizing the received sound wave to generate a voltage having a predetermined frequency, beating the frequency of the generated voltage with the frequency of the original frequency modulated wave to produce a beat frequency which is representative of the distance between the point of transmission of the sound wave and the surface from which said sound wave is reflected, and employing the beat frequencies produced during one complete scanning cycle for actuating a recording apparatus to visibly record the cross-sectional area of the well bore.

3. The method of determining the cross-sectional area of a well bore which consists in, continuously generating within the well bore a series of original frequency modulated electrical waves, utilizing said waves to generate a continuous series of high frequency sound waves which are propagated outwardly from a point within the well bore in radial planes toward the wall thereof, the point of propagation of the waves being continuously varied about an annular path within the well bore whereby the propagated waves scan the wall of the well bore, receiving adjacent the point of transmission of each sound wave the reflected or echo sound wave after it has been reflected from the wall of the bore, utilizing the received sound wave to generate a voltage having a predetermined frequency, beating the frequency of the generated voltage with the frequency of the original frequency modulated wave to produce a beat frequency which is representative of the distance between the point of transmission of the sound wave and the surface from which said sound wave is reflected, integrating the beat frequencies produced by the propagation and reception of all the sound waves sent and received in one scanning cycle, and transposing said integrated beat frequencies into a visible indication which is representative of the cross-sectional area of the well bore.

4. The method of determining the cross-sectional area of a well bore as set forth in claim 3, whereby the transposition of the integrated beat frequencies into a visible indication is effected by electrically transposing said integrated frequencies into amplitude, and then converting said amplitude into a visible indication.

5. An apparatus for determining the cross-sectional area of a well bore including, a measuring assembly adapted to be lowered within the well bore and having rotatable means for continuously transmitting a series of supersonic waves outwardly therefrom whereby each wave travels outwardly and upon striking the wall of the bore is reflected or echoed back toward the point of transmission in a radial plane, said assembly also having rotatable receiving means adjacent the transmitting means for receiving each wave after it has been reflected from a reflecting surface, means for continuously and simultaneously rotating the transmitting and receiving means whereby the sound waves transmitted during one revolution of said transmitting means scan the wall of the well bore, means within the assembly for generating at the instant of transmission of each sound wave a radio frequency wave having a predetermined frequency cycle, whereby said frequency at that instant is representative of the instant of transmission of said sound wave, means within the assembly actuated by the sound wave receiving means upon the reception of each sound wave for generating a radio frequency voltage of a predetermined frequency cycle, and means for beating the frequency of the last-named generated voltage at the instant of sound reception of each sound wave against the frequency of the electrical wave which was generated at the instant of transmission of that particular sound wave whereby a beat frequency is produced which is representative of the time interval between transmission and reception of said sound wave, and means for integrating the beat frequencies produced by all sound waves transmitted and received during one revolution of the transmitting and receiving means to provide information as the distance between the point of transmission and the reflecting surface.

6. An apparatus as set forth in claim 5, wherein the transmitting and receiving means are rotated at a speed which is less than the frequency of the sound waves whereby each sound wave is transmitted, reflected and received without any appreciable change in the rotative position of said transmitting and receiving means.

7. An apparatus for determining the cross-sectional area of a well bore including, a measuring assembly adapted to be lowered within the well bore and having rotatable means for continuously transmitting a series of supersonic waves outwardly therefrom whereby each wave travels outwardly and upon striking the wall of the bore is reflected or echoed back toward the point of transmission in a radial plane, said assembly also having rotatable receiving means adjacent the transmitting means for receiving each wave after it has been reflected from a reflecting surface, means for continuously and simultaneously rotating the transmitting and receiving means whereby the sound waves transmitted during one revolution of said transmitting means scan the wall of the well bore, means within the assembly for generating at the instant of transmission of each sound wave a radio frequency wave having a predetermined frequency cycle, whereby said frequency at that instant is representative of the instant of transmission of said sound wave, means within the assembly actuated by the sound wave receiving means upon the reception of each sound wave for generating a radio frequency voltage of a predetermined frequency cycle, and means for beating the frequency of the last-named generated voltage at the instant of sound reception of each sound wave against the frequency of the electrical wave which was generated at the instant of transmission of that particular sound wave whereby a beat frequency is produced which is representative of the time interval between transmission and reception of said sound wave, means at the surface of the well bore for integrating all of the beat frequencies produced by the transmission and reception of the sound waves during one revolution of the transmitting and receiving means, and a visible indicating means actuated by the integrated beat frequencies for indicating the cross-sectional area of said well bore.

8. An apparatus for determining the cross-sectional area of a well bore including, a measuring assembly adapted to be lowered within the well bore and having rotatable means for continuously transmitting a series of supersonic waves outwardly therefrom whereby each wave travels outwardly and upon striking the wall of the bore is reflected or echoed back toward the point of transmission in a radial plane, said assembly also having rotatable receiving means adjacent the transmitting means for receiving each wave after it has been reflected from a reflecting surface, means for continuously and simultaneously rotating the transmitting and receiving means whereby the sound waves transmitted during one revolution of said transmitting means scan the wall of the well bore, means within the assembly for generating at the instant of transmission of each sound wave a radio frequency wave having a predetermined frequency cycle, whereby said frequency at that instant is representative of the instant of transmission of said sound wave, means within the assembly actuated by the sound wave receiving means upon the reception of each sound wave for generating a radio frequency voltage of a predetermined frequency cycle, means for beating the frequency of the last-named generated voltage at the instant of sound reception of each sound wave against the frequency of the electrical wave which was generated at the instant of transmission of that particular sound wave whereby a beat frequency is produced which is representative of the time interval between transmission and reception of said sound wave, electrical means at the surface of the well bore for integrating the beat frequencies produced by the transmission and reception of all of the sound waves during one revolution of the transmitting and receiving means, additional electrical means for converting the integrated frequencies into amplitude, an electrically operated recorder, and means for actuating the recorder by said amplitude which is representative of the time interval measurements made during one revolution of the transmitting and receiving means and is also representative of the cross-sectional area of the well bore.

9. An apparatus as set forth in claim 7, wherein the transmitting and receiving means are rotated at a speed which is less than the frequency of the sound waves whereby each sound wave is transmitted, reflected and received without any appreciable change in the rotative position of said transmitting and receiving means.

10. An apparatus for determining the cross-sectional area of a well bore including, a measuring assembly adapted to be lowered within said bore and having a sound wave transmitter circuit and a sound wave receiver circuit, the transmitter circuit including means for generating a frequency modulated radio frequency wave and a high frequency sound generating sending crystal connected thereto, whereby generation of the wave actuates the sending crystal to generate and propagate supersonic waves outwardly toward the wall of the well bore, the receiving circuit including a receiving crystal which, upon receiving the transmitted sound waves after they have travelled outwardly to a reflecting surface and have been echoed back, generates a radio frequency voltage, and a beat frequency mixer in the receiver circuit having electrical connection with the receiving crystal and also having electrical connection with the frequency modulated radio wave generator, whereby the frequency of the voltage generated by the receiving crystal at the instant of reception of each sound wave is beat with the particular frequency of the frequency modulated radio wave which was generated at the instant of transmission of that particular sound wave, whereby a beat frequency is produced which is a measurement of the time interval between the instant of transmission of each sound wave and the instant of reception of said sound wave and is therefore representative of the distance between the point of transmission and the wall surface of the well bore from which said sound wave is reflected, means for continuously rotating the sending and receiving crystals to continuously vary the point of transmission and reception of sound waves in an annular path within the bore to thereby scan the wall of the bore, and means for integrating the beat frequencies produced by the transmission and reception of all sound waves during one revolution of said sending and receiving crystals, and electrical means at the surface of the well bore for transposing the integrated beat frequencies into a visible indication of the cross-sectional area of the well bore.

11. An apparatus as set forth in claim 10, wherein the sending crystal is continuously actuating to constantly transmit and propagate the sound waves and also wherein the sending and receiving crystals are rotated continuously so as to scan the wall of the well bore, the frequency of said sound waves being so much greater than the speed of rotation of the crystals that each wave is sent, reflected and received without any appreciable change in the radial position of the rotating crystals.

12. An apparatus for determining the cross-sectional area of a well bore including, a measuring assembly adapted to be lowered within said bore and having a sound wave transmitter circuit and a sound wave receiver circuit, the transmitter circuit including means for generating a frequency modulated radio frequency wave and a high frequency sound generating sending crystal connected thereto, whereby generation of the wave actuates the sending crystal to generate and propagate supersonic waves outwardly toward the wall of the well bore, the receiving circuit including a receiving crystal which, upon receiving the transmitted sound waves after they have travelled outwardly to a reflecting surface and have been echoed back, generates a radio frequency voltage, and a beat frequency mixer in the receiver circuit having electrical connection with the receiving crystal and also having electrical connection with the frequency modulated radio wave generator, whereby the frequency of the voltage generated by the receiving crystal at the instant of reception of each sound wave is beat with the particular frequency of the frequency modulated radio wave which was generated at the instant of transmission of that particular sound wave, whereby a beat frequency is produced which is a measurement of the time interval between the instant of transmission of each sound wave and the instant of reception of said sound wave and is therefore representative of the distance between the point of transmission and the wall surface of the well bore from which said sound wave is reflected, means for continuously actuating the sending crystal to constantly transmit and propagate the sound waves, means for continuously rotating the sending and receiving crystals to thereby continuously scan the wall of the well bore, the frequency of said sound waves being so much greater than the speed of rotation of the crystals that each wave is sent, reflected and received without any appreciable change in the radial position of the rotating crystals, means at the surface of the well bore electrically connected with the measuring assembly for receiving the beat frequencies produced during each revolution of the crystals and for converting all of said frequencies into an average amplitude, which is representative of the average well bore diameter measured by one revolution of the crystals, and a recorder actuated by the amplitude for visibly indicating the average well bore diameter at the point of measurement.

RALPH W. GOBLE.

REFERENCES CITED

The following references are of record in the file of this patent:

UNITED STATES PATENTS

| Number | Name | Date |
|---|---|---|
| 1,547,574 | Fay | July 28, 1925 |
| 1,547,575 | Fay | July 28, 1925 |
| 2,156,052 | Cooper | Apr. 25, 1939 |
| 2,231,243 | Beers | Feb. 11, 1941 |
| 2,248,599 | Alexanderson | July 8, 1941 |
| 2,268,587 | Guanella | Jan. 6, 1942 |
| 2,350,371 | Smith | June 6, 1944 |
| 2,368,532 | Fearon | Jan. 30, 1945 |
| 2,370,818 | Silverman | Mar. 6, 1945 |
| 2,405,134 | Brown et al. | Apr. 8, 1947 |
| 2,418,490 | Turner | Apr. 8, 1947 |
| 2,433,361 | Harrison | Dec. 30, 1947 |
| 2,536,771 | Rost | Jan. 2, 1951 |

FOREIGN PATENTS

| Number | Country | Date |
|---|---|---|
| 546,202 | Great Britain | July 2, 1942 |